(12) United States Patent
Eromäki

(10) Patent No.: US 9,686,468 B2
(45) Date of Patent: Jun. 20, 2017

(54) IMAGING APPARATUS

(71) Applicant: Microsoft Technology Licensing, LLC, Redmond, WA (US)

(72) Inventor: Marko Eromäki, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/884,049

(22) Filed: Oct. 15, 2015

(65) Prior Publication Data

US 2017/0111578 A1     Apr. 20, 2017

(51) Int. Cl.
| | | |
|---|---|---|
| H04N 5/225 | (2006.01) | |
| H04N 5/232 | (2006.01) | |
| H04N 13/02 | (2006.01) | |
| H04N 5/247 | (2006.01) | |

(52) U.S. Cl.
CPC ....... *H04N 5/23238* (2013.01); *H04N 5/2252* (2013.01); *H04N 5/2253* (2013.01); *H04N 5/23245* (2013.01); *H04N 5/247* (2013.01); *H04N 13/0239* (2013.01)

(58) Field of Classification Search
CPC ........ G03B 35/00; G03B 35/08; G03B 37/00; G03B 37/04; H04N 5/23238; H04N 13/0239
See application file for complete search history.

(56) References Cited

U.S. PATENT DOCUMENTS

| | | |
|---|---|---|
| 6,392,687 B1 | 5/2002 | Driscoll et al. |
| 6,795,113 B1 | 9/2004 | Jackson et al. |
| 7,525,567 B2 | 4/2009 | McCutchen |
| 7,856,180 B2 * | 12/2010 | Chishima ............... G03B 17/04 348/36 |
| 8,659,640 B2 | 2/2014 | Steuart |
| 8,730,299 B1 | 5/2014 | Kozko |
| 9,204,128 B2 * | 12/2015 | Morioka ................ G03B 35/08 |
| 2004/0130658 A1 * | 7/2004 | Yamaguchi ........... G06F 1/1616 348/375 |
| 2010/0045773 A1 | 2/2010 | Ritchey |
| 2010/0134597 A1 * | 6/2010 | Wu ..................... H04N 13/0239 348/47 |
| 2012/0206565 A1 | 8/2012 | Villmer |

(Continued)

FOREIGN PATENT DOCUMENTS

WO     2008034942 A1    3/2008

OTHER PUBLICATIONS

Duval, Nils, "What's up with Stereographic 3D Panoramic Video", Published on: Feb. 12, 2014, Available at: http://www.video-stitch.com/whats-stereographic-3d-panoramic-video/.

(Continued)

*Primary Examiner* — W B Perkey

(57) ABSTRACT

An apparatus is described. An embodiment of an apparatus comprises a stationary first camera; a second camera; and a mechanical coupling enabling a first and a second camera position, wherein the mechanical coupling enables the rotation of the second camera with respect to the stationary first camera; wherein in the first camera position the first camera and the second camera are orientated in substantially opposite directions, and in the second camera position the second camera is orientated in substantially the same direction as the stationary first camera.

20 Claims, 9 Drawing Sheets

(56) References Cited

U.S. PATENT DOCUMENTS

| 2013/0038697 | A1* | 2/2013 | Chen ............... G03B 35/10 |
| | | | 348/47 |
| 2013/0250040 | A1 | 9/2013 | Vitsnudel et al. |
| 2014/0071227 | A1 | 3/2014 | Takenaka et al. |
| 2014/0267596 | A1 | 9/2014 | Geerds |

OTHER PUBLICATIONS

Rehm, Lars, "Hands-on with the Panono Panoramic Ball Camera", Published on: Dec. 26, 2013, Available at: http://connect.dpreview.com/post/9786486758/hands-on-with-the-panono-ball-camera.
"DashCamReview-AGPtekDualDashCam", Published on: Apr. 28, 2014, Available at: https://www.youtube.com/watch?v=YbXZp6xU-6A.

* cited by examiner

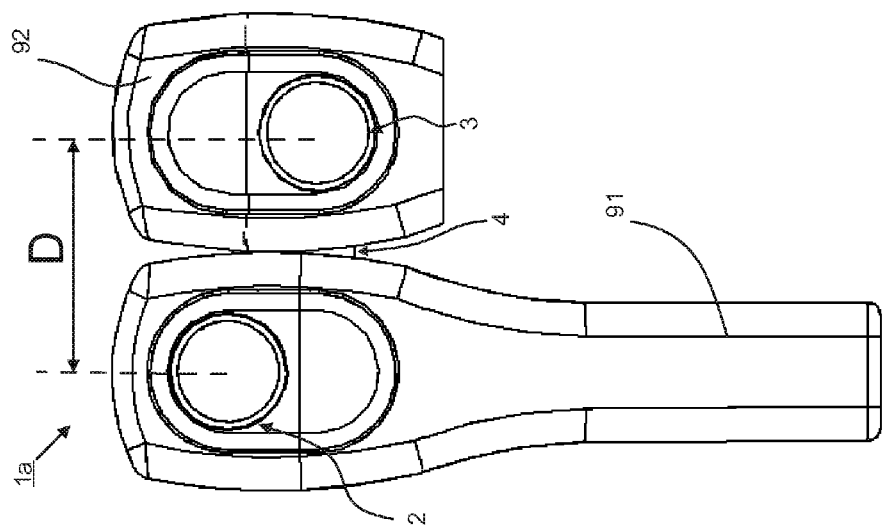
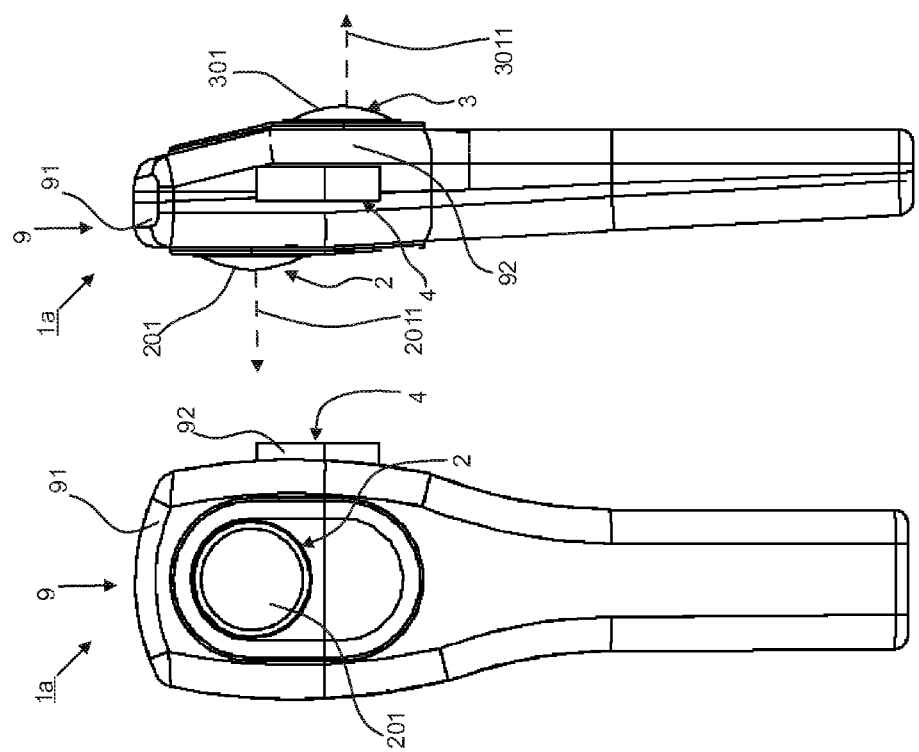

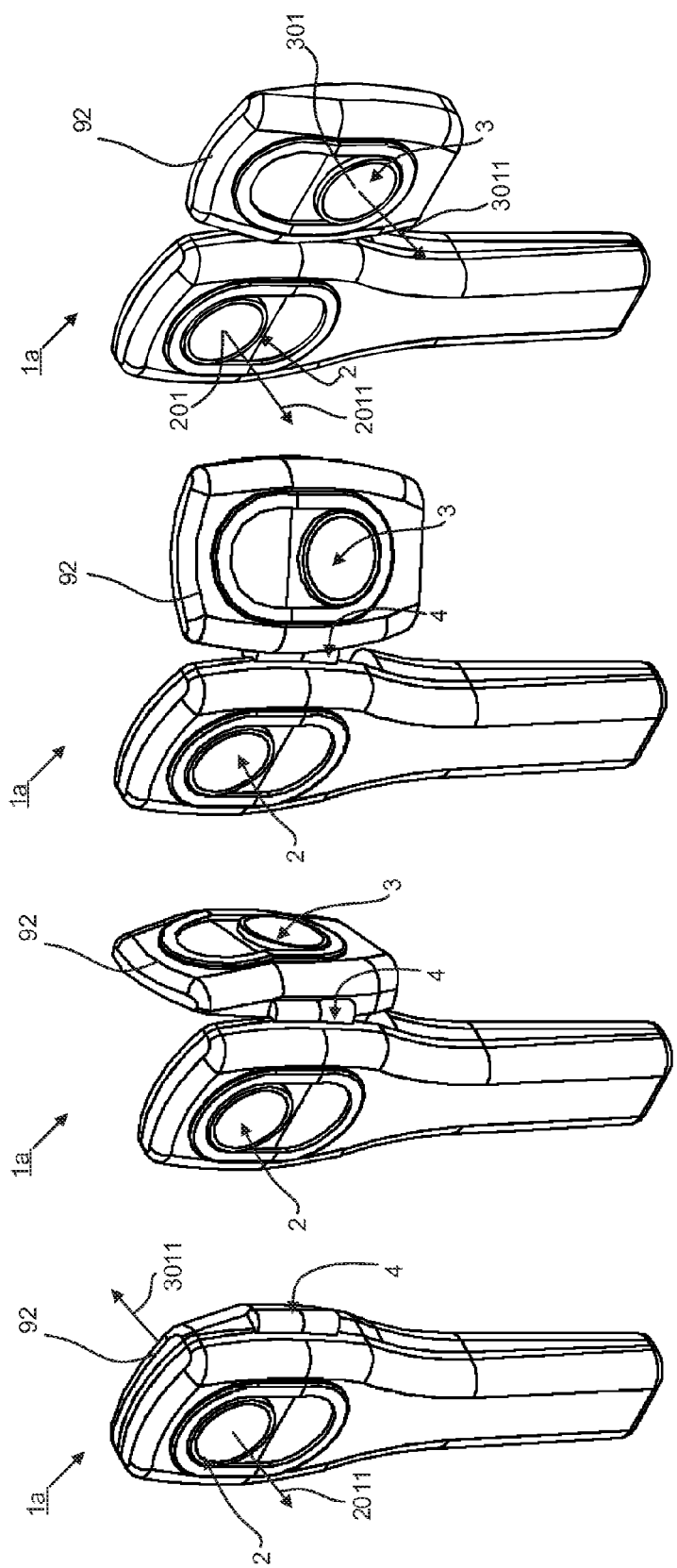

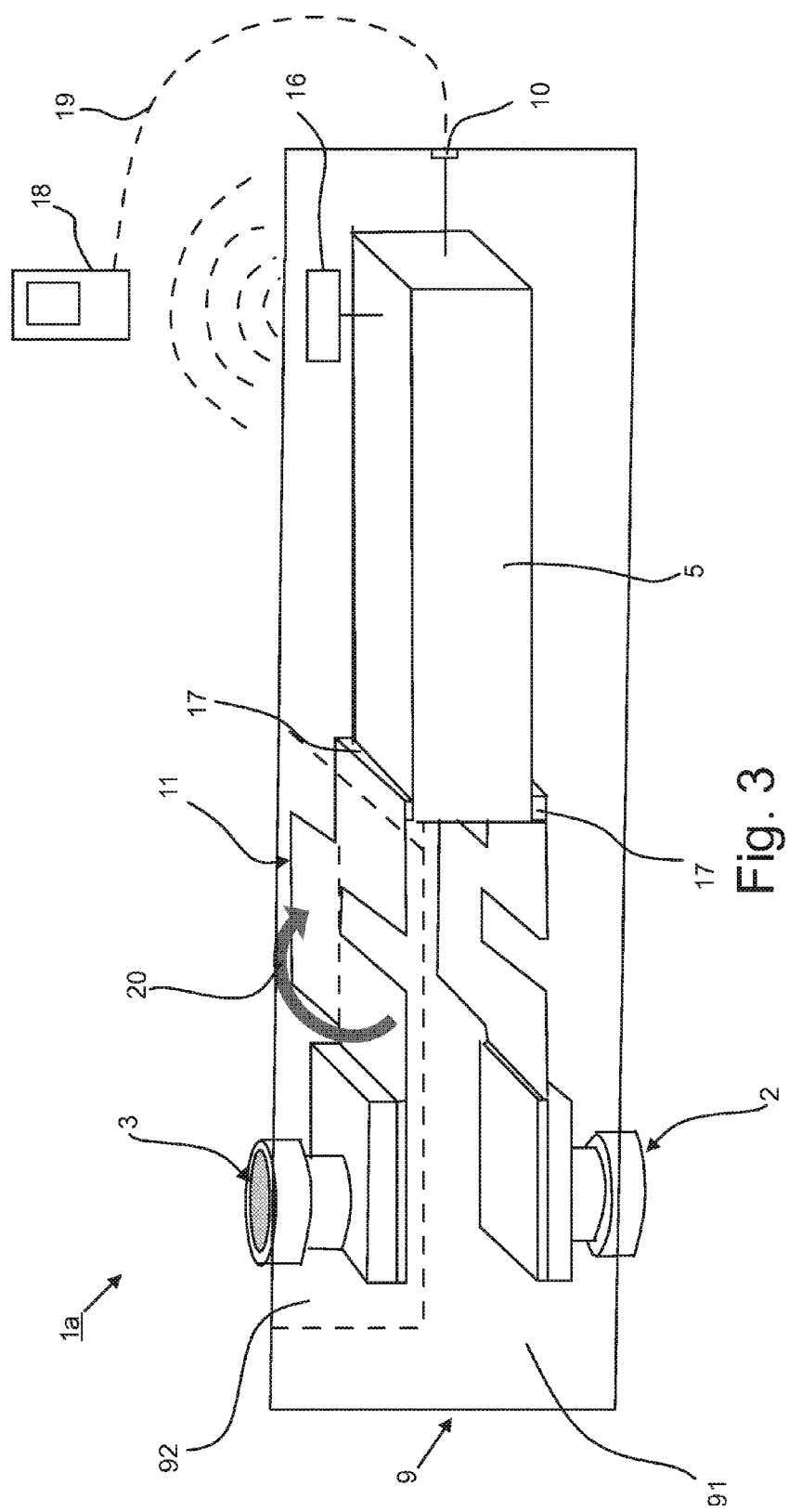

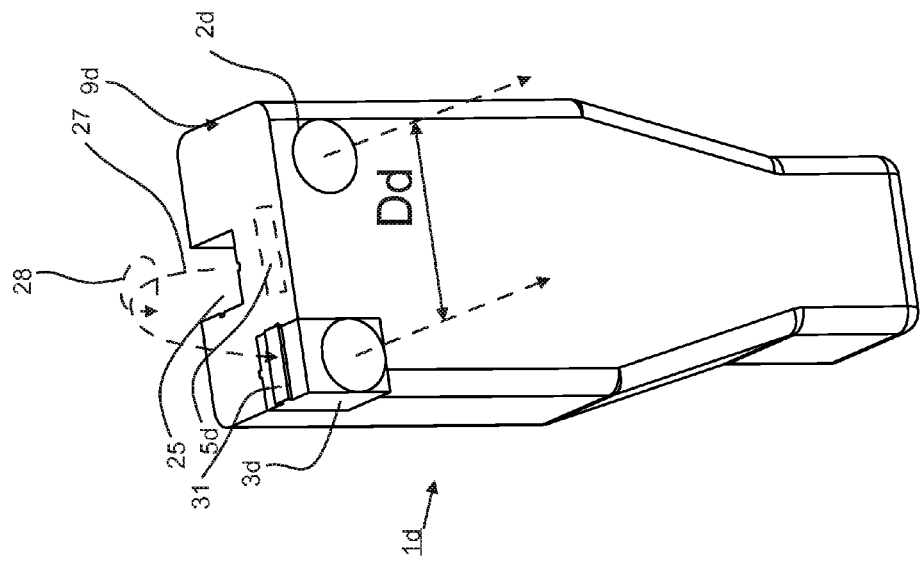
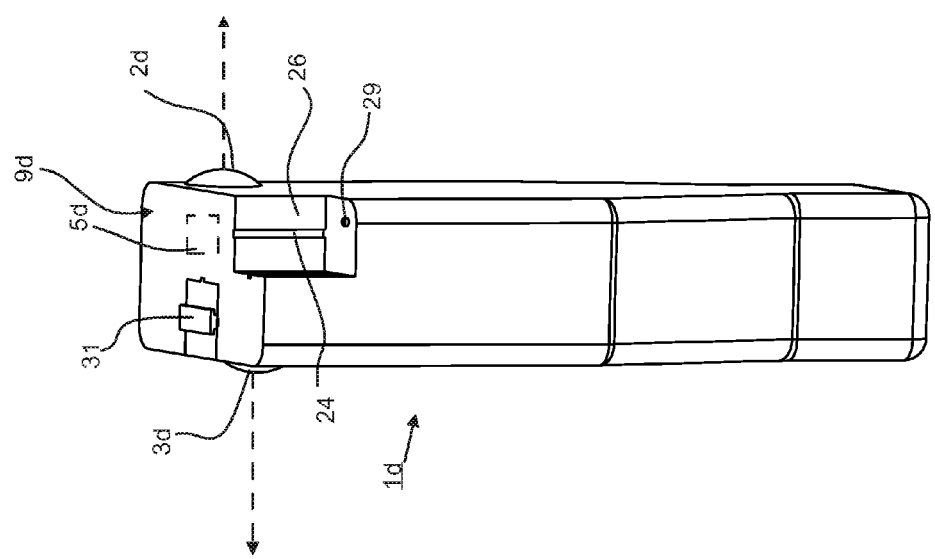

IMAGING APPARATUS

BACKGROUND

The need from consumers for advanced imaging, such as virtual reality or 3D imaging, leads to a demand for additional functionality in electronic devices comprising a digital camera.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of an apparatus comprises a stationary first camera; a second camera; and a mechanical coupling enabling a first and a second camera position, wherein the mechanical coupling enables the rotation of the second camera with respect to the stationary first camera; wherein in the first camera position the first camera and the second camera are orientated in substantially opposite directions, and in the second camera position the second camera is orientated in substantially the same direction as the stationary first camera.

An embodiment of an apparatus comprises a housing comprising: a stationary first camera; a second camera; a mechanical coupling enabling a first and a second camera position, wherein the mechanical coupling enables rotation of the second camera with respect to the stationary first camera, wherein in the first camera position the mechanical coupling enables the stationary first camera and the second camera to be orientated in substantially opposite directions, and in the second camera position the mechanical coupling enables the second camera to be orientated in substantially the same direction as the stationary first camera; and a hardware unit able to capture 360 degree panoramic image data in the first camera position and stereoscopic image data in the second camera position.

An embodiment of an apparatus comprises a housing comprising; a first electrical camera connection slot; a second electrical camera connection slot; and a stationary first camera; and a detachable second camera enabling a first and a second camera position; wherein in the first camera position the detachable second camera is configured to be connected to the first electrical camera connection slot enabling the stationary first camera and the detachable second camera to be orientated in substantially opposite directions, and in the second camera position the detachable second camera is configured to be connected to the second electrical camera connection slot enabling the detachable second camera to be orientated in substantially the same direction as the stationary first camera.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein:

FIG. 1A is a front side illustration of an embodiment of an apparatus, and

FIG. 1B is a side view illustration of the apparatus.

FIG. 1C is an illustration of the apparatus of FIG. 1A in a second camera position, when a pivoting housing part is in an unfolded position.

FIGS. 2A-2D illustrates phase-by-phase unfolding of a pivoting housing part of the apparatus of FIG. 1A.

FIG. 3 is a schematical illustration of the apparatus of FIG. 1A.

FIG. 9A is an illustration of another embodiment of an apparatus.

FIG. 9B is an illustration of the apparatus, when a detachable second camera is in a second camera position.

Like reference numerals are used to designate like parts in the accompanying drawings.

DETAILED DESCRIPTION

Figure 4:
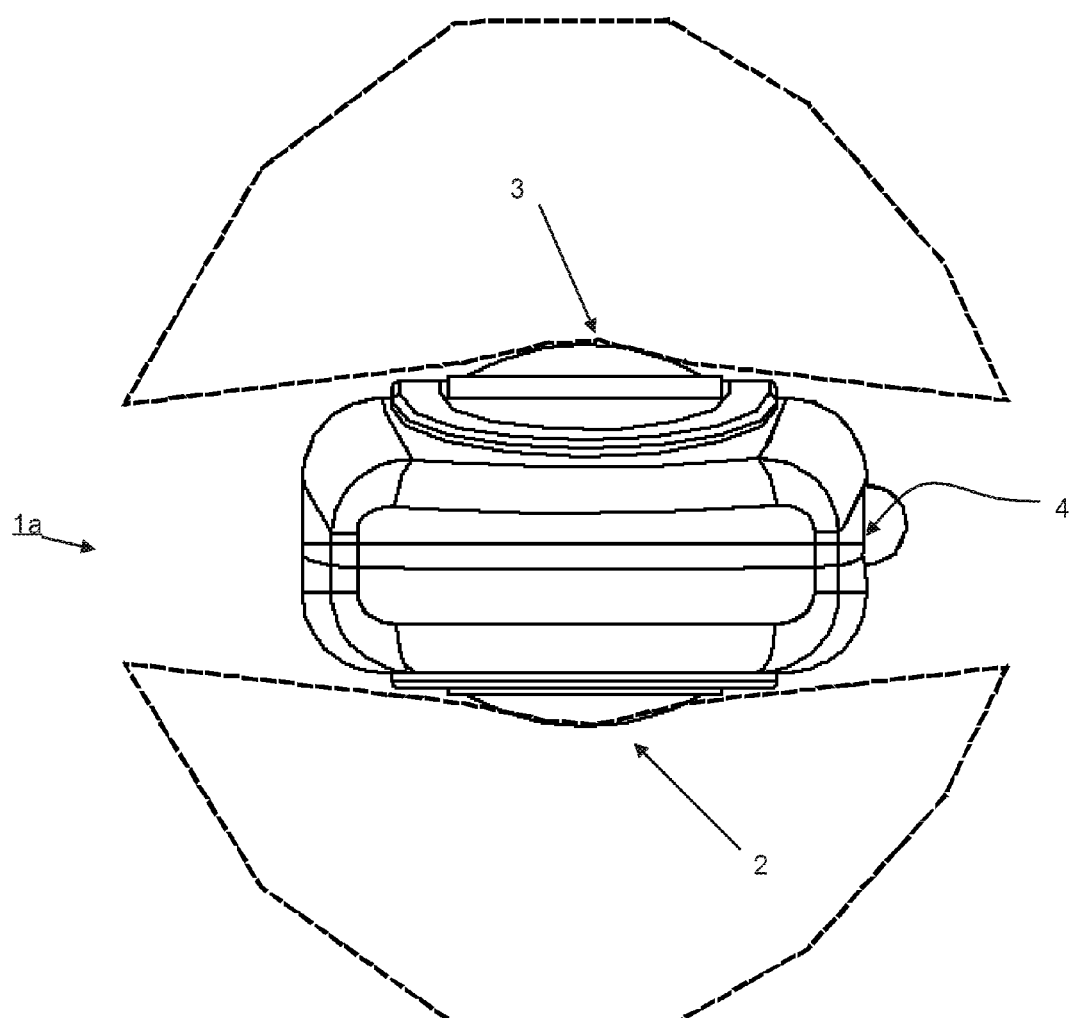
FIG. 4 is a top view illustration of the apparatus of FIG. 1A.

The detailed description provided below in connection with the appended drawings is intended as a description of the present embodiments and is not intended to represent the only forms in which the present apparatus may be constructed or utilized. However, the same or equivalent functions and sequences may be accomplished by different embodiments or a combination thereof.

Often advanced imaging equipment is needed for 3D virtual reality. It is also advantageous that the user may see the image as it is in real life as a panoramic image. In panoramic photography it is possible to capture images with elongated fields of view. A panoramic image may be zoomed or rotated in order to see the details in the image. Another need from users of electronic equipment with cameras is 3D imaging by using a stereoscopic image and 3D glasses. A stereoscopic image may be accomplished with two images and with a parallax between the images. By using 3D glasses the stereoscopic image appears to the user as a 3D image.

FIG. 1A is a front side illustration of an embodiment of an apparatus 1a, and FIG. 1B is a side view illustration of the apparatus 1a. The apparatus 1a comprises a housing 9 comprising a non-pivoting housing part 91 and a pivoting housing part 92. The non-pivoting housing part 91 comprises a stationary first camera 2. The pivoting housing part 92 comprises a second camera 3. The apparatus 1a comprises a mechanical coupling 4, for example, a hinge, providing a connection between the non-pivoting housing part 91 and the pivoting housing part 92. The hinge 4 may be a separate part to be connected to the non-pivoting housing part 91 and the pivoting housing part 92 or it may be integrated into the housing 9. In FIGS. 1A and 1B the hinge 4 is an integrated part of the housing 9. As the pivoting housing part 92 is connected to the non-pivoting housing part 91 via the hinge 4, the pivoting of the pivoting housing part 92 with respect to the non-pivoting housing part 91 is enabled. The pivoting housing part 92 may have a folded or an unfolded position. FIGS. 1A and 1B illustrate the apparatus 1a in a first camera position, when the pivoting housing part 92 is in a folded position. The stationary first camera 2 has a first lens 201 and the second camera 3 has a second lens 301. The stationary first camera 2 is part of the non-pivoting housing part 91 and is thereby stationary. The second camera 3 is part of the pivoting housing part 92. In the first camera position, the stationary first camera 2 and the second camera 3 are orientated in substantially opposite directions and are configured to capture substantially different content in opposite directions. In the first camera position, an optical axis of the first camera 2011 is pointing in a direction substantially opposite to an optical axis of the second camera 3011.

FIG. 1C is an illustration of the apparatus 1a of FIG. 1A in the second camera position, when the pivoting housing part 92 is in the unfolded position. As the pivoting housing part 92 may be hinged with the non-pivoting housing part 91 by the hinge, the rotation of the second camera 3 with respect to the stationary first camera 2 is enabled. In the second camera position the second camera 3 is orientated in substantially the same direction as the stationary first camera 2. In the second camera position the second camera 3 is configured to capture substantially same content as the stationary first camera 2. A distance D between the stationary first camera 2 and the second camera 3 creates a parallax in between the image captured by the stationary first camera 2 and the image captured by the second camera 3.

FIG. 2A-2D illustrate phase-by-phase unfolding of the pivoting housing part 92 of the apparatus 1a of FIG. 1A. The unfolding may be performed manually by moving the pivoting housing part 92 in to the second camera position illustrated in FIG. 2D where the first lens 201 of the stationary first camera 2 is at the same vertical plane as the second lens 301 of the second camera 3. Further, in the second camera position, the optical axis of the first camera 2011 is pointing in substantially the same direction as the optical axis of the second camera 3011.

FIG. 3 is a schematical illustration of the apparatus 1a of FIG. 1A. In FIG. 3 the stationary first camera 2 and the second camera 3 are connected to a hardware unit 5 inside the non-pivoting housing part 91 of the apparatus 1a. The hardware unit 5 is mounted inside the housing 9, for example, in the non-pivoting housing part 91. In the first camera position the hardware unit 5 may be in a 360 degree panoramic image mode. In the second camera position the hardware unit 5 may be in a stereoscopic image mode. The hardware unit 5 may be able to collect 360 degree panoramic image data in the first camera position and stereoscopic image data in the second camera position. In the first camera position the stationary first camera 2 and the second camera 3 are configured to capture substantially different content. Content from the stationary first camera 2 and content from the second camera 3 are used to create the 360 degree panoramic image data in the hardware unit 5. In the second camera position the second camera 3 is configured to capture substantially same content as the stationary first camera 2. There is some difference between the images captured by the stationary first camera 2 and the second camera 3 due to the distance D between the stationary first camera 2 and the second camera 3. By combining the image data from the stationary first camera 2 and the second camera 3, stereoscopic image data may be created in the hardware unit 5.

The apparatus 1a may further comprise a flexible electric connection 11 and an electric connection 17. The hardware unit 5 is connected to the stationary first camera 2 with the electric connection 17 and the flexible electric connection 11 is led through the mechanical coupling 4 into the pivoting housing part 92 to connect the second camera 3 to the hardware unit 5. The flexible electric connection 11 may comprise a slack portion that extends when the second camera 3 is rotated to the second camera position, thereby enabling the second camera 3 to rotate with the pivoting housing part 92. This rotation is illustrated with an arrow 20. The hardware unit 5 may be connected to an input-output interface 10, for example, to a mini-USB port. Additionally or alternatively, the hardware unit 5 may be connected to a Wi-Fi module 16 wirelessly transmitting the 360 degree spherical image data or the stereoscopic image data to an external receiving device 18, such as a computer, laptop or a mobile phone 17. Alternatively, the apparatus 1a may be connected to the external receiving device 18 using an external cable 19. The external cable 19 may also be used to charge a battery of the apparatus 1a. In the receiving device 18 a computer program may be utilized to transform the 360 degree spherical image data into a 360 degree panoramic image. Alternatively, this transformation may be done in situ in the hardware unit 5. In this case the hardware unit 5 transmits complete 360 degree panoramic image data.

Figure 5:
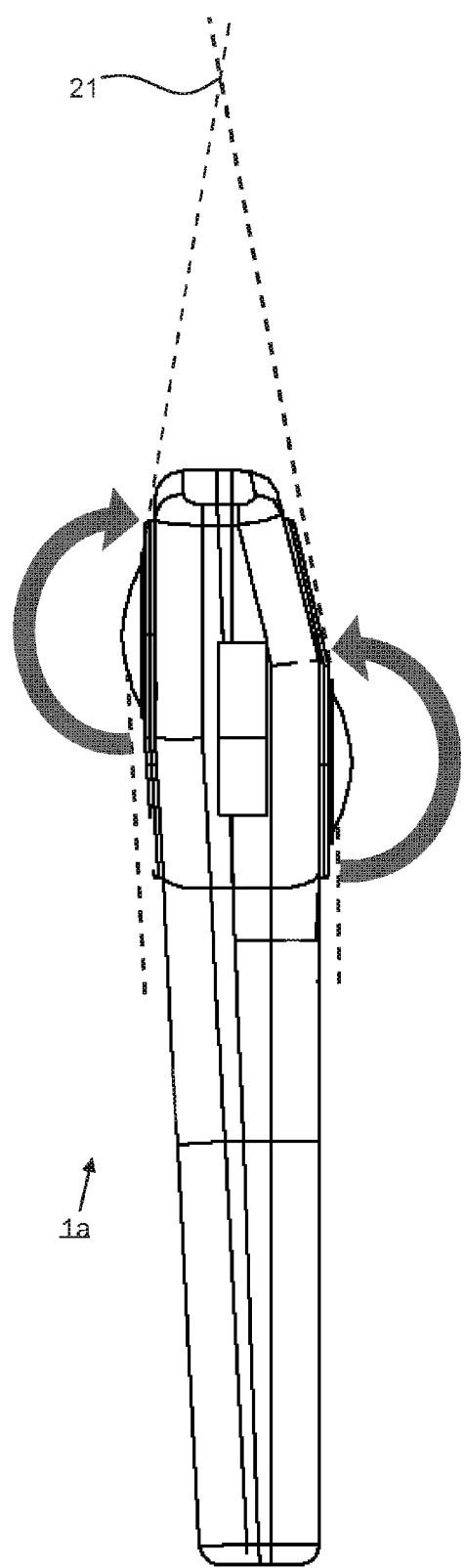
FIG. 5 is a side view illustration of an embodiment of the apparatus of FIG. 1A.

FIG. 4 is a top view illustration of the apparatus 1a of FIG. 1A. In FIG. 4 the apparatus 1a is in the first camera position, i.e. in the folded position. FIG. 5 is a side view illustration of the apparatus 1a of FIG. 1A. Also in FIG. 5 the pivoting housing part 92 in is in the first camera position, i.e. in the folded position. In the embodiment illustrated in FIG. 4, the stationary first camera 2 and the second camera 3 have a field of view of approximately 190 degrees. As the field of view is more than 180 degrees, it is possible to generate a 360 degree panoramic image. FIG. 5 illustrates that both fields of view have a common image point 21 above the apparatus 1a. Another common image point is in the opposite side of the apparatus 1a so that the user holding the apparatus 1a will be cut away from the image data recorded by the stationary first camera 2 and the second camera 3. The common image points are used to combine the images captured by the stationary first camera 2 and the second camera 3 in the second camera position.

Figure 6:
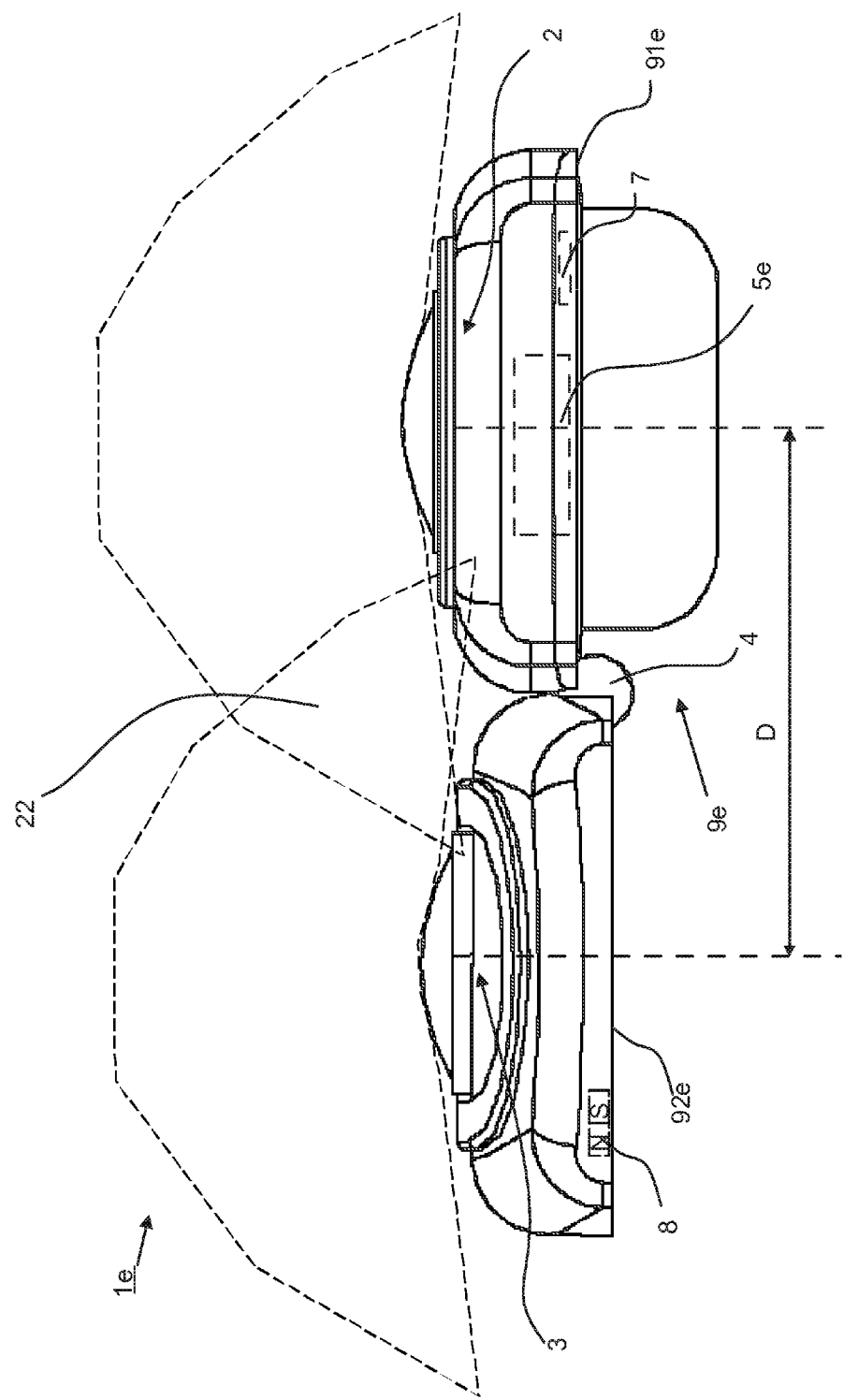
FIG. 6 is a top view illustration of another embodiment of an apparatus.

FIG. 6 is a top view illustration of another embodiment of an apparatus 1e. In FIG. 6 the apparatus 1e is in the second camera position. In the second camera position, the stationary first camera 2 and the second camera 3 may have a field of view between 150 degrees and 180 degrees. The stationary first camera 2 and the second camera 3 have a common area of view 22. The distance D is used to create the stereoscopic image. The position of the second camera 3 in a pivoting housing part 92e is designed to create a suitable parallax for creating the stereoscopic image.

The apparatus 1e may comprise a Hall sensor 7 and a magnet 8. The Hall sensor 7 may be configured in a non-pivoting housing part 91e and the magnet 8 may be configured in the pivoting housing part 92e enabling the detection of the position of the second camera 3 with respect to the stationary first camera 2. When the user starts to rotate the pivoting housing part 92e, the Hall sensor 7 detects the rotational movement and is configured to provide an indication to the hardware unit 5e, causing the hardware unit 5e to change from a 360 degree panoramic image mode to a stereoscopic image mode. When the pivoting housing part 92e is returned back to the first camera position, the Hall sensor 7 detects this and is configured to provide an indication to the hardware unit 5e, causing the hardware unit 5e to change from the stereoscopic image mode back to the 360 degree panoramic image mode.

Figure 7:
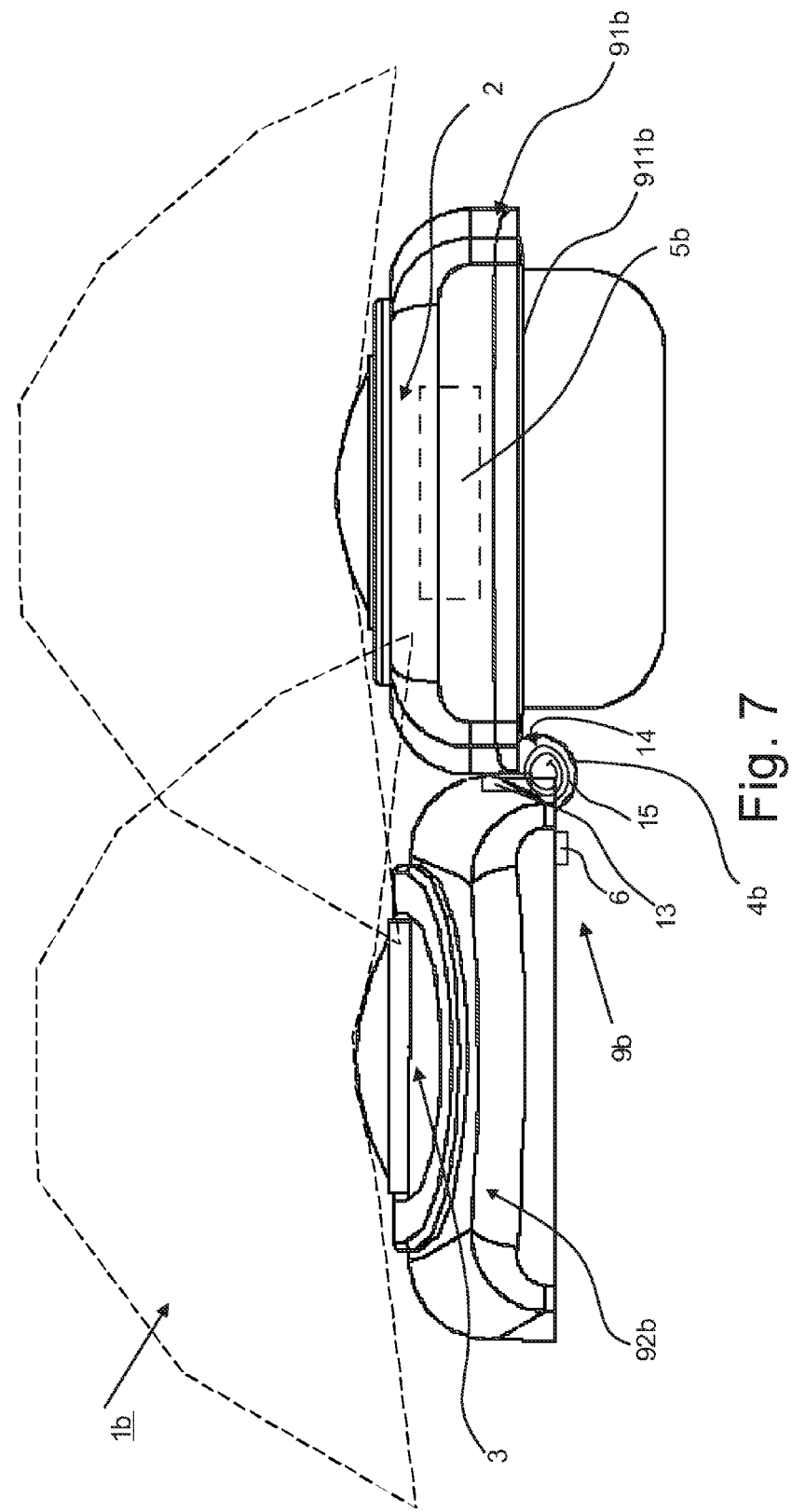
FIG. 7 is a top view illustration of another embodiment of an apparatus.

FIG. 7 is a top view illustration of another embodiment of an apparatus 1b. In FIG. 7 the apparatus 1b is in the second camera position. The apparatus 1b may comprise a stopper 13 providing an endpoint to which a pivoting housing part 92b is rotatable. The stopper 13 may be formed into the non-pivoting housing part 91b as part of the non-pivoting housing part 91b or, for example, it may be a separate part in the non-pivoting housing part 91b or a hinge 4b. The apparatus 1b may also comprise a spring mechanism 14, which when released from its compressed state, is configured to rotate the second camera 3 to the endpoint. The spring mechanism 14 may comprise at least one viscously dampened spring 15. With the viscously dampened spring 15 the pivoting housing part 92b may be smoothly unfolded to the second camera position by smoothly rotating the pivoting housing part 92b. The apparatus 1b may also comprise a switch 6 having a first electric position and a second electric position. In the first electric position the switch 6 is configured to provide an indication that the second camera 3 is about to be rotated from the first camera position to the second camera position. In the second electric position the switch 6 is configured to provide an indication that the second camera 3 is returned from the second camera position back to the first camera position. The switch 6 may be, for example, a push type switch, which is closed when the second camera 3 is in the first camera position and pushed by a rear face 911b of a non-pivoting housing part 91b giving a first signal to a hardware unit 5b. The first signal causes the apparatus 1b to change from a 360 degree panoramic image mode to a stereoscopic image mode. When the user starts to rotate the pivoting housing part 92b to the second camera position, the switch 6 opens giving a second signal to the hardware unit 5b. The second signal causes the apparatus 1b to change from the stereoscopic image mode back to the 360 degree panoramic image mode.

Figure 8:
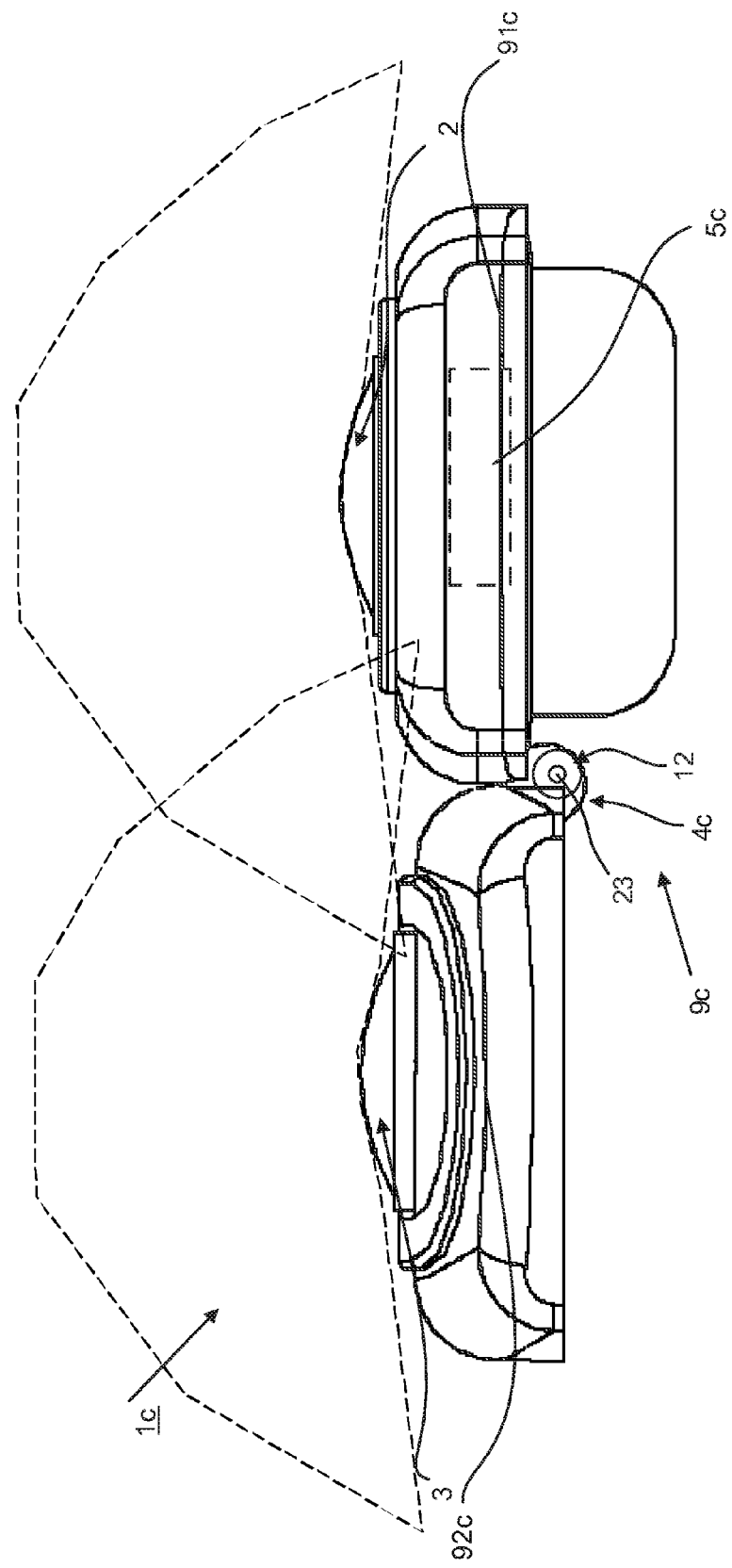
FIG. 8 is a top view illustration of another embodiment of an apparatus.

FIG. 8 is a top view illustration of another embodiment of an apparatus 1c. In FIG. 8, the apparatus 1c is in the second camera position. A mechanical coupling 4c may comprise an actuator 12. With the actuator 12 the unfolding of the pivoting housing part 92c may be motorized. The actuator 12, for example an electric motor, may comprise a rotatable member 23 configured to be connected to the pivoting housing part 92c. The rotatable member 23 enables the pivoting housing part 92c to be pivoted with respect to the non-pivoting housing part 91c. The actuator 12 may be controlled by a hardware unit 5c located in the non-pivoting housing part 91c. For example, the actuator 12 may be located into the non-pivoting housing part 91c, wherein the rotatable member 23, for example a shaft of the electric motor, is connected to the pivoting housing part 92c.

FIG. 9A is an illustration of another embodiment of an apparatus 1d. In FIG. 9A a detachable second camera 3d of the apparatus 1d is in a first camera position. FIG. 9B is an illustration of the apparatus 1d, when the detachable second camera 3d is in a second camera position. A housing 9d comprises a first electrical camera connection slot 25, a second electrical camera connection slot 26, and a stationary first camera 2d. The detachable second camera 3d has a first and a second camera position. In the first camera position the detachable second camera 3d is configured to be connected to the first electrical camera connection slot 25 enabling the stationary first camera 2d and the detachable second camera 3d to be orientated in substantially opposite directions. When the detachable second camera 3d is moved to the second camera position, the detachable second camera 3d is manually moved from the first electrical camera connection slot 25 to the second electrical camera connection slot 26. Then the detachable second camera 3d is orientated in substantially the same direction as the stationary first camera 2d. The movement of the detachable second camera 3d to the second electrical camera connection slot is illustrated with arrows 27, 28. The first and the second electric connection slots 25, 26 may comprise a locking member 29 enabling locking of the detachable second camera 3d in place. The locking member 29 may function also as an electric connector. The first and the second electric connection slots 25, 26 may comprise one or more grooves 24 that guide the detachable second camera 3d. The user may manually lift the detachable second camera 3d from a lifting portion 31 of the detachable second camera 3d without the risking the lens of the detachable second camera 3d. For example, by lifting the detachable second camera 3d from the lifting portion 31, the lens of the detachable second camera 3d may be less in contact with fingers and thereby finger prints on the lens of the detachable second camera 3d may be avoided or reduced during the switching of the orientation of the detachable second camera 3d. As illustrated earlier, a distance Dd between the cameras 2d, 3d is provided in the second camera position.

In one or more of the above embodiments, in the first camera position the stationary first camera 2, 2d and the second camera 3 or the detachable second camera 3d of the apparatus 1a, 1b, 1c, 1d, 1e are configured to be orientated in substantially opposite directions. In one or more of the above embodiments, in the second camera position, the second camera 3 or the detachable second camera 3d of the apparatus 1a, 1b, 1c, 1d, 1e is configured to be orientated in substantially the same direction as the stationary first camera 2, 2d.

Further, it is possible to transform image data from the apparatus 1a, 1b, 1c, 1d, 1e into a 360 degree panoramic image in the first camera position and create stereoscopic images in second camera position. The operating mechanism for moving the second camera 3 from the first camera position to the second camera position may be easy and reliable. There may be no need to equip the apparatus 1a, 1b, 1c, 1d, 1e with a third camera on a same side as the stationary first camera 2, 2d, because the second camera 3 or the detachable second camera 3d can be orientated in substantially the same direction as the stationary first camera 2, 2d. Further, there may be no need to use a separate apparatus for making stereoscopic images as the stereoscopic image functionality is already integrated into the apparatus 1a, 1b, 1c, 1d, 1e. This dual use may also give more freedom to a user to shoot images or make videos. The apparatus 1a, 1b, 1c, 1d, 1e may be constructed as a substantially small hand-held device which may be carried, for example, in a pocket or a bag. Because of the dual use of the second camera 3 or the detachable second camera 3d, the user may carry only one device instead of two separate devices, which may also result in savings for the user from an economical point of view. The pivoting housing part 92, 92b, 92e of the apparatus 1a, 1b, 1e and the hinge attached to the pivoting housing part 92, 92b, 92e enables the specific distance D between the stationary first camera 2 and the second camera 3 when the pivoting housing part 92, 92b, 92e is unfolded. This may be useful when creating stereoscopic images.

The apparatus 1a, 1b, 1c, 1d, 1e disclosed in the embodiments above may be useful in a solution where the apparatus 1a, 1b, 1c, 1d, 1e is implemented as a hand-held electronic device, such as a digital camera or as a digital camera module integrated into an electronic communication device, such as a smart phone or a tablet or a smart wearable apparatus.

An embodiment of an apparatus comprises a stationary first camera; a second camera; and a mechanical coupling enabling a first and a second camera position, wherein the mechanical coupling enables the rotation of the second camera with respect to the stationary first camera; wherein in the first camera position the stationary first camera and the second camera are orientated in substantially opposite directions, and in the second camera position the second camera is orientated in substantially the same direction as the stationary first camera.

An embodiment of an apparatus comprises a stationary first camera; a second camera; and a mechanical coupling enabling a first and a second camera position, wherein the mechanical coupling enables the rotation of the second camera with respect to the stationary first camera; wherein in the first camera position the stationary first camera and the second camera are configured to capture substantially different content in opposite directions and in the second camera position the second camera is configured to capture substantially same content as the stationary first camera.

In one embodiment, in the first camera position the stationary first camera and the second camera are configured to capture substantially different content in opposite directions and in the second camera position the second camera is configured to capture substantially same content as the stationary first camera.

In one embodiment, the apparatus comprises a hardware unit, which is able to capture 360 degree spherical image data in the first camera position and stereoscopic image data in the second camera position.

In one embodiment, the apparatus comprises a hardware unit, which is able to capture 360 degree panoramic image data in the first camera position and stereoscopic image data in the second camera position.

In one embodiment, the apparatus comprises a switch having a first electric position and a second electric position, wherein in the first electric position the switch is configured to provide an indication that the second camera is about to be rotated from the first camera position to the second camera position and in the second electric position the switch is configured to provide an indication that the second camera is returned from the second camera position back to the first camera position.

In one embodiment, the switch is configured to provide a first signal that causes the apparatus to change from a 360 degree panoramic image mode to a stereoscopic image mode.

In one embodiment, the switch is configured to provide a second signal that causes the apparatus to change from a stereoscopic image mode to a 360 degree panoramic image mode.

In one embodiment, the mechanical coupling comprises a hinge.

In one embodiment, the apparatus comprises a non-pivoting housing part comprising the stationary first camera and a pivoting housing part comprising the second camera, wherein the mechanical coupling comprises a hinge between the non-pivoting housing and the pivoting housing part enabling the pivoting housing part to be pivoted with respect to the non-pivoting housing part.

In one embodiment, the apparatus comprises a flexible electric connection and a hardware unit, wherein the hardware unit is located in the non-pivoting housing part and is connected to the stationary first camera, wherein the flexible electric connection is configured via the hinge to the pivoting housing part to connect the second camera to the hardware unit.

In one embodiment, the apparatus comprises a Hall sensor and a magnet, wherein the Hall sensor is configured in the non-pivoting housing part and the magnet is configured in the pivoting housing part, enabling to detect the position of the second camera with respect to the stationary first camera.

In one embodiment, the apparatus comprises a non-pivoting housing part comprising the stationary first camera and a pivoting housing part comprising the second camera, wherein the mechanical coupling comprises an actuator comprising a rotatable member configured to be connected to the pivoting housing part enabling the pivoting housing part to be pivoted with respect to the non-pivoting housing part.

In one embodiment, the apparatus comprises a stopper providing an endpoint to which the second camera is rotatable.

In one embodiment, the apparatus comprises a spring mechanism, which when released from its compressed state, is configured to rotate the second camera to the endpoint.

In one embodiment, the spring mechanism comprises at least one viscously dampened spring.

In one embodiment, the stationary first camera and the second camera have a field of view more than 180 degrees.

In one embodiment, in the first camera position the stationary first camera and the second camera have a field of view of 190 degrees and in the second camera position the stationary first camera and the second camera have a field of view from 150 degrees up to 180 degrees.

In one embodiment, the apparatus is a hand-held electronic device.

In one embodiment, a hand-held electronic device comprises the apparatus.

In one embodiment, an electronic device comprises the apparatus.

An embodiment of an apparatus is a hand-held electronic device, comprising a stationary first camera, a second camera and a mechanical coupling.

An embodiment of an apparatus comprises a housing comprising: a stationary first camera; a second camera; a mechanical coupling enabling a first and a second camera position, wherein the mechanical coupling enables rotation of the second camera with respect to the stationary first camera, wherein in the first camera position the mechanical coupling enables the stationary first camera and the second camera to be orientated in substantially opposite directions, and in the second camera position the mechanical coupling enables the second camera to be orientated insubstantially the same direction as the stationary first camera; and a hardware unit able to capture 360 degree panoramic image data in the first camera position and stereoscopic image data in the second camera position.

An embodiment of an apparatus comprises a first electrical camera connection slot; a second electrical camera connection slot; and a stationary first camera; and a detachable second camera enabling a first and a second camera position; wherein in the first camera position the detachable second camera is configured to be connected to the first electrical camera connection slot enabling the stationary first camera and the detachable second camera to be orientated in substantially opposite directions, and in the second camera position the detachable second camera is configured to be connected to the second electrical camera connection slot enabling the detachable second camera to be orientated insubstantially the same direction as the stationary first camera.

Although the subject matter has been described in a language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments or a combination thereof. The embodiments are not limited to those that solve any or all of the stated problems or those that have any or all of the stated benefits and advantages.

Aspects of any of the embodiment described above may be combined with aspects of any of the other embodiment described to form further embodiment without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one embodiment may also be connected in any combination to any other embodiment.

The invention claimed is:

1. An apparatus comprising:
   a stationary first camera;
   a second camera;
   a mechanical coupling enabling a first and a second camera position, wherein the mechanical coupling enables a rotation of the second camera with respect to the stationary first camera, wherein in the first camera position the stationary first camera and the second camera are orientated in substantially opposite directions, and in the second camera position the second camera is orientated in substantially the same direction as the stationary first camera; and
   a hardware unit for capturing 360 degree image data in the first camera position, and stereoscopic image data in the second camera position.

2. The apparatus according to claim 1, wherein in the first camera position the stationary first camera and the second camera are configured to capture substantially different content in opposite directions and in the second camera position the second camera is configured to capture substantially same content as the stationary first camera.

3. The apparatus according to claim 1, wherein the 360 degree image data is 360 degree spherical image data.

4. The apparatus according to claim 1, wherein the 360 degree image data is 360 degree panoramic image data.

5. The apparatus according to claim 1, wherein the apparatus comprises a switch having a first electric position and a second electric position, wherein in the first electric position the switch is configured to provide an indication that the second camera is about to be rotated from the first camera position to the second camera position and in the second electric position the switch is configured to provide an indication that the second camera is returned from the second camera position back to the first camera position.

6. The apparatus according to claim 5, wherein the switch is configured to provide a first signal that causes the apparatus to change from a 360 degree panoramic image mode to a stereoscopic image mode.

7. The apparatus according to claim 5, wherein the switch is configured to provide a second signal that causes the apparatus to change from a stereoscopic image mode to a 360 degree panoramic image mode.

8. The apparatus according to claim 1, wherein the mechanical coupling comprises a hinge.

9. The apparatus according to claim 1, wherein the apparatus comprises a non-pivoting housing part comprising the stationary first camera and a pivoting housing part comprising the second camera, wherein the mechanical coupling comprises a hinge between the non-pivoting housing part and the pivoting housing part enabling the pivoting housing part to be pivoted with respect to the non-pivoting housing part.

10. The apparatus according to claim 9, wherein the apparatus comprises a flexible electric connection, wherein the hardware unit is located in the non-pivoting housing part and is connected to the stationary first camera, and wherein the flexible electric connection is configured via the hinge to the pivoting housing part to connect the second camera to the hardware unit.

11. The apparatus according to claim 9, wherein the apparatus comprises a Hall sensor and a magnet, wherein the Hall sensor is configured in the non-pivoting housing part and the magnet is configured in the pivoting housing part, enabling to detect the position of the second camera with respect to the stationary first camera.

12. The apparatus according to claim 1, wherein the apparatus comprises a non-pivoting housing part comprising the stationary first camera and a pivoting housing part comprising the second camera, wherein the mechanical coupling comprises an actuator comprising a rotatable member configured to be connected to the pivoting housing part enabling the pivoting housing part to be pivoted with respect to the non-pivoting housing part.

13. The apparatus according to claim 1, wherein the apparatus comprises a stopper providing an endpoint to which the second camera is rotatable.

14. The apparatus according to claim 13, wherein the apparatus comprises a spring mechanism, which when released from its compressed state, is configured to rotate the second camera to the endpoint.

15. The apparatus according to claim 14, wherein the spring mechanism comprises at least one viscously dampened spring.

16. The apparatus according to claim 1, wherein the stationary first camera and the second camera have a field of view more than 180 degrees.

17. The apparatus according to claim 1, wherein in the first camera position the stationary first camera and the second camera have a field of view of 190 degrees and in the second camera position wherein the stationary first camera and the second camera have a field of view from 150 degrees up to 180 degrees.

18. The apparatus according to claim 1, wherein the apparatus is a hand-held electronic device.

19. An apparatus comprising:
    a housing comprising:
       a stationary first camera;
       a second camera;
       a mechanical coupling enabling a first and a second camera position, wherein the mechanical coupling enables rotation of the second camera with respect to the stationary first camera, wherein in the first camera position the mechanical coupling enables the stationary first camera and the second camera to be orientated in substantially opposite directions, and in the second camera position the mechanical coupling enables the second camera to be orientated in substantially the same direction as the stationary first camera; and a hardware unit able to capture 360 degree panoramic image data in the first camera position and stereoscopic image data in the second camera position.

20. An apparatus comprising:

a housing comprising;

a first electrical camera connection slot;

a second electrical camera connection slot; and a stationary first camera; and a detachable second camera enabling a first and a second camera position;

wherein in the first camera position the detachable second camera is configured to be connected to the first electrical camera connection slot enabling the stationary first camera and the detachable second camera to be orientated in substantially opposite directions, and in the second camera position the detachable second camera is configured to be connected to the second electrical camera connection slot enabling the detachable second camera to be orientated in substantially the same direction as the stationary first camera.

* * * * *